United States Patent [19]
Cohen

[11] Patent Number: 5,354,375
[45] Date of Patent: Oct. 11, 1994

[54] LIME SLUDGE TREATMENT PROCESS
[75] Inventor: Sidney M. Cohen, Allentown, Pa.
[73] Assignee: Fuller Company, Bethlehem, Pa.
[21] Appl. No.: 134,366
[22] Filed: Oct. 12, 1993
[51] Int. Cl.⁵ .................................... C04B 28/22
[52] U.S. Cl. ........................ 106/792; 106/738; 106/745; 106/793; 423/175; 423/177; 264/333
[58] Field of Search ............... 106/792, 793, 738, 745; 588/251; 264/56, 333; 501/155; 423/173, 175, 177; 432/95, 96, 215; C04B 28/22

[56] References Cited
U.S. PATENT DOCUMENTS

| | | | |
|---|---|---|---|
| 2,232,834 | 2/1941 | Ahlmann | 423/177 |
| 3,203,761 | 8/1965 | Neuville | 423/177 |
| 4,098,871 | 7/1978 | Schoppe | 423/177 |
| 4,606,722 | 8/1986 | Olauson | 432/14 |
| 4,852,269 | 8/1989 | Glorioso | 34/11 |
| 4,952,147 | 8/1990 | Boyden, II et al. | 432/103 |
| 4,993,942 | 2/1991 | Boyden, II et al. | 432/14 |

Primary Examiner—Mark L. Bell
Assistant Examiner—Paul Marcantoni
Attorney, Agent, or Firm—Daniel DeJoseph

[57] ABSTRACT

Disclosed is a method and an apparatus for the heat treatment of lime sludge ($CaCO_3$) to form burnt lime (CaO). In the method of the present invention lime sludge is dried in a gas dryer means, to produce a dried lime sludge. The dried lime sludge is separated from the gases and thereafter is first fed to a compacting means wherein it is compacted into a plurality of substantially uniform bodies which are thereafter fed to a shaft kiln in which the compacted dried lime sludge is converted to active burnt lime.

8 Claims, 1 Drawing Sheet

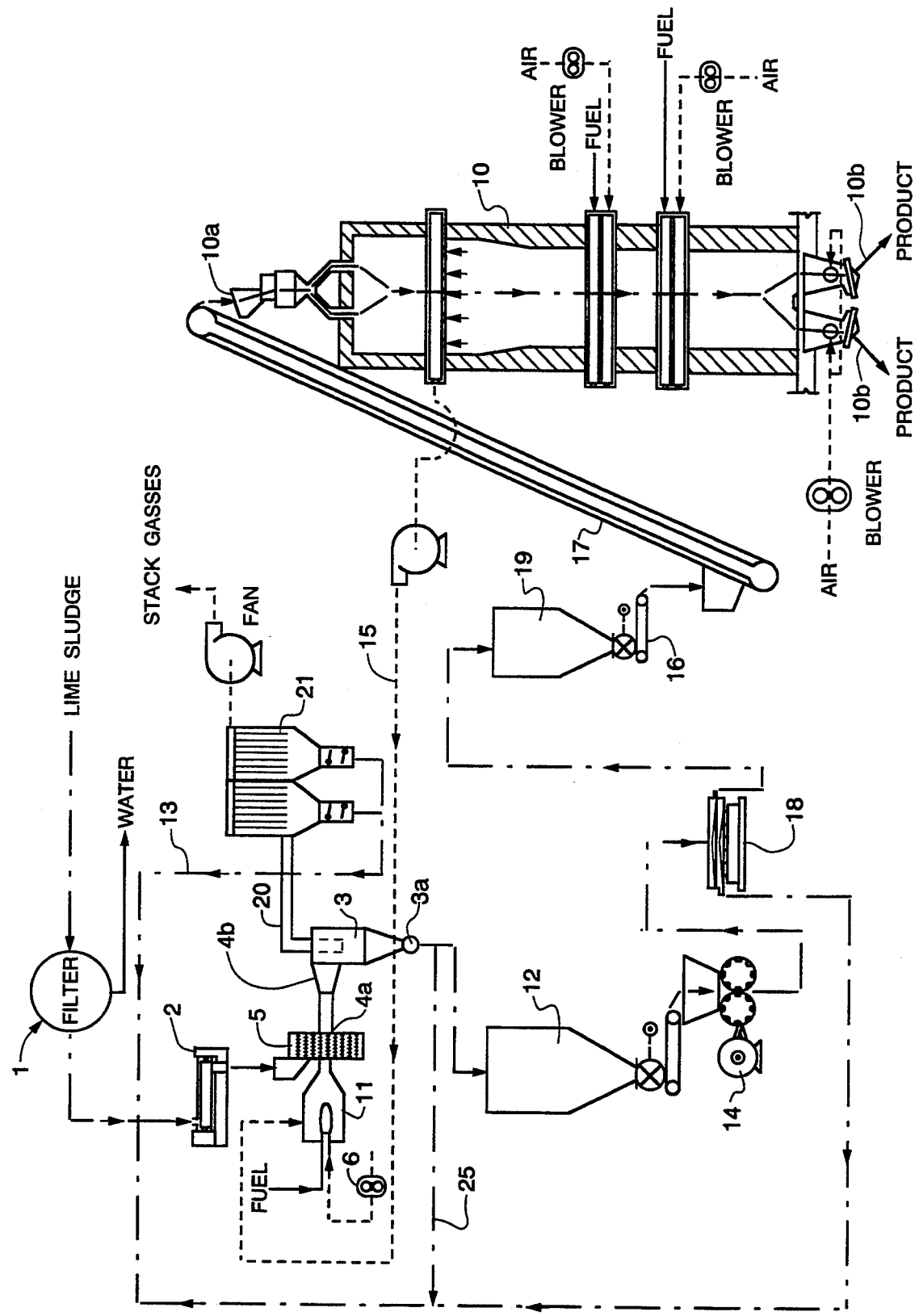

LIME SLUDGE TREATMENT PROCESS

The present invention relates to a method and apparatus for treating, generally known as "reburning" lime sludge (which is mainly $CaCO_3$) in order to regenerate the sludge, which, for example, in a paper making method has been separated in connection with a causticizing process, to form CaO. The method of the present invention is also adaptable to treating lime sludge generated in other industrial processes, such as in the sugar industry or the water treatment industry.

In prior art processes such lime sludge is generally treated in rotary kilns or, less frequently, in fluid-bed systems.

With regard now to the paper industry in particular, the preparation of pulp from wood is usually carried out by cooking the wood according to the sulphate or soda method.

During the cooking process, wood is charged together with a cooking liquid consisting of NaOH and $Na_2S$ (in the sulphate method), with the major portion of the lignin contents of the wood being dissolved. Thereafter the pulp formed in the cooking is purified by washing in a second step. In order to achieve a satisfactory quality the washed pulp is often treated by screening and bleaching with different bleaching chemicals.

After treatment the finished pulp is fed to a pulp dryer or directly to a paper mill.

The spent liquor derived from pulp washing contains dissolved wood substances and the chemicals charged in cooking. For recovery of these, the spent liquor is usually concentrated by evaporation of the major portion of its water contents in an evaporation plant, after which the spent liquor is burnt in a so-called recovery boiler where the chemicals charged are recovered in the form of $Na_2CO_3$ in a so-called green liquor. Depending on the choice of cooking method $Na_2S$ may also be found in the green liquor.

To make it possible to recycle the recovered chemicals in the cooking process the $Na_2CO_3$ contents of the green liquor must be converted into NaOH. This is usually carried out by treatment of the green liquor with burnt lime (CaO) in the causticizing reaction to form a so-called "white liquor" containing lime sludge according to the following reaction sequence:

$$Na_2CO_3 + CaO + H_2O \rightarrow 2NaOH + CaCO_3$$

The lime sludge ($CaCO_3$) formed is then converted into burnt lime (CaO) by so-called lime sludge reburning, which generally utilizes a lime sludge reburning rotary kiln, according to the following reaction sequence:

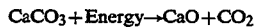

$$CaCO_3 + Energy \rightarrow CaO + CO_2$$

As indicated above this lime sludge reburning is usually carried out in rotary tubular lime sludge reburning kilns, into which cold water-containing lime sludge is passed in counterflow to flue gases generated in the opposite end of the kiln, usually by combustion of oil or natural gas. The lime sludge undergoes the following reactions in sequence in the kiln: drying, heating and reburning, the temperature of emerging burnt lime generally being about 1900° F. to 2200° F.

In view of the high energy costs involved in lime sludge reburning attempts are constantly being made in the pulp and other industries to improve the energy economy.

Typically, the fuel consumption figures, for starting lime sludge that contains from about 22% to about 30% moisture, will range from 5 to $9 \times 10^5$ BTU/ST of lime produced from these sludges.

Although the majority of the above discussion is directed to the treatment of lime sludge in the paper industry, it is also adaptable to treat lime sludge produced in other processes. For example, in the sugar beet industry limestone is used to generate $CO_2$ gas and lime, both of which are used to process sugar. A lime sludge (as $CaCO_3$) is generated and normally discarded. When it is to be reused, a rotary kiln process is utilized in the same manner as in the paper industry. In water treatment process lime may on occasion be used to remove some impurities again resulting in a lime sludge product. A fluid-bed process is typically used to regenerate sludge to CaO in such a process.

It is an object of the present invention, therefore, of producing a lime product from a lime sludge in the above and other processes utilizing a lower rate of fuel consumption then set forth above. In addition, it is an object of the present invention to produce a lime product wherein the process has reduced space requirements over current rotary kiln and fluid-bed systems.

The above and other objects are realized by the present invention in which a shaft kiln is utilized in the treatment of lime sludge.

BRIEF DESCRIPTION OF THE DRAWING

The invention is described closer below with reference to the accompanying FIGURE which is a schematic of an exemplary apparatus used for carrying out the method of the invention.

DETAILED DESCRIPTION OF THE DRAWING

The FIGURE schematically illustrates the principle of the apparatus and the method of the present invention.

The apparatus and method of the present invention is directed to treating lime sludge through the use of a shaft kiln, which heretofore has not been utilized for such a purpose and, more particularly, through the combination of a drying apparatus, such as a flash dryer, and a shaft kiln. This combination results in energy and space saving over previous rotary kiln or fluid-bed systems.

In the method of the present invention, fresh lime sludge, which typically has a water content of about 2.0% to about 30% (by weight) and is generally supplied from lime filter 1 is fed into flash dryer 4 for drying. Optionally said lime sludge is first fed into mixer 2 located upstream (relative to material flow) from said flash dryer 4, wherein in the depicted embodiment said mixer 2 is a pug mill but which could be other mixing devices. In such optional embodiment, fresh sludge is mixed with a portion of predried sludge (supplied from separation cyclone 3 via recycling conduit means 25 connected to discharge end 3a of cyclone 3), to produce a less moist feed, which after said mixing in mill 2 typically has a moisture content of from about 15% to about 20%, for feeding into flash dryer 4 via material inlet 4a. Thus, depending on whether such an optional recycling feature is utilized, the feed into the flash dryer will have a moisture content that ranges from about 15% to about 30% by weight.

As indicated, fresh lime sludge (or the optional lime sludge mixture) is fed into flash dryer 4, which is optionally preceded by an agitating means such as a cage mill 5, which is utilized to break up any lumps that may have formed in the feed. It is understood that, while a flash dryer is preferred, other drying equipment such as a rotary dryer, may be employed.

Flash dryer 4 will typically have a controlled gas exit temperature of from about 200° F. to about 300° F. The gas utilized in the flash dryer 4 may be provided by blower 6 and can also consist of off gases (ranging from approximately 300° F. to approximately 500° F.) from shaft kiln 10 (such as via conduit 15), the temperature of both being elevated by a separately fired combustion chamber 11 from approximately 800° F. to approximately 1000° F.

Lime sludge exiting flash dryer 4 at material discharge conduit 4b is typically dried to less than 2% moisture content and is pneumatically fed to a separator means 3, e.g. a separator cyclone. The gases, along with product fines, dust and other impurities, are separated from the dried product in cyclone 3 and pass via conduit 20 to dust collector or baghouse 21. As indicated previously, a portion of the separated, dried lime mud may be fed to optional mixer 2 as described above. In addition, separated product fines from baghouse 21 may optionally be recirculated via conduit 13 and mixed with fresh lime sludge.

The separated product is then fed to a feed bin 12 from which it will be fed into a compacting means 14, or, alternatively, may be fed directly to said compacting means 14, where it is compacted into generally uniform shaped bodies to be fed into shaft kiln 10, which is utilized in place of the rotary kilns of prior conventional systems.

In compacting means 14, the dried lime sludge will be compacted into a plurality of generally uniform bodies of a size suitable to be employed by shaft kiln 10. The dried sludge may, for example, or be pelletized by know processes or the sludge may, preferably, be briquetted by being first fed to briquetting press 14 in which material is compacted into briquettes, which typically, for standard shaft kilns, will have dimensions that range from 2"×2"×1" up to 6"×2"×2" depending on the ease of briquetting and the need to control the pressure drop of the shaft kiln. The compacted dried lime sludge is thereafter fed via a suitable conveying means into shaft kiln 10. As depicted, the product will optionally pass from cyclone 3 to shaft kiln 10 via first feed bin 12, briquetting press 14, vibrating screen 18 (to remove fines), second feed bin 19, weight feeder 16 and skid hoist 17. Obviously, other methods of delivering the dried briquetted lime mud from cyclone 3 to shaft kiln 10 are known in the art and can be utilized in the present invention, depending upon the needs of the practitioner.

The dried compacted lime sludge is calcined and converted to active burnt lime at temperatures ranging from about 1650° F. to about 2200° F. within the calcining area of the shaft kiln to a final calcined active lime. The shaft kiln can be an annular, regenerative or straight shaft design. Ideally, the latter using burner beams would be the least costly in capital investment.

The shaft kiln utilized in the present invention will typically comprise a generally vertical hollow structure having an inlet 10a at an upper end thereof and a discharge site 10b at the lower end.

In one type of shaft kiln that may be used in the present invention, oil cooled burner beams are used to distribute fuel (gas, oil or coal) and primary air the full diameter of the kiln above designated portions of the shaft kiln. Cooling gas is introduced in each of four discharge legs and is used to control a uniform flow down the shaft unit by use of separate vibrating feeders. The cooling air will become secondary preheated air below the burner beams.

The apparatus and process of the present invention has shown the capability of reducing overall fuel consumption by 15% to 50% over conventional rotary kiln and fluid-bed lime sludge recovery systems, and, because of the use of a shaft kiln in place of a conventional rotary kiln, has reduced space requirements. In addition, the process of the present invention employs complete utilization of all material with no waste streams.

It is intended that the foregoing be a description of a preferred embodiment and that the invention be limited solely by that which is within the scope of the appended claims.

What is claimed is:

1. A method of heat treating lime sludge ($CaCO_3$) to form burnt lime (CaO), comprising the steps of:
   a. feeding fresh lime sludge to a flash dryer means, wherein said fresh lime sludge is entrained in heated gases, to thereby produce a dried lime sludge, wherein said dried lime sludge has a moisture content of less than about 2% (by weight);
   b. separating the dried lime sludge from the heated gases in which said dried lime sludge is entrained;
   c. feeding the separated, dried lime sludge to a compacting apparatus to thereby compact the dried sludge into a plurality of briquettes of a size suitable to be fed to a shaft kiln;
   d. feeding the compacted dried lime sludge to a shaft kiln wherein the dried lime sludge is converted to active burnt lime at temperatures that ranges from about 1650° F. to about 2200° F.

2. The method of claim 1 wherein the lime sludge utilized in step (a) has a moisture content that ranges from about 20% to about 30% by weight.

3. The method of claim 1 wherein the lime sludge utilized in step (a) has a moisture content of from about 15% to about 20% by weight.

4. The method of claim 3 wherein, in step (a), the fresh lime sludge has a quantity of dried lime sludge mixed therewith, said dried lime sludge being a portion of the dried, separated lime sludge formed pursuant to step (b) which is recycled to a mixer means to therein be mixed with fresh lime sludge to form the mixture used in step (a).

5. The method of claim 4 wherein the mixer means is a pug mill.

6. The method of claim 1 wherein off gases from the shaft kiln are utilized in the dryer means.

7. The method of claim 1 wherein the gases that are utilized in the dryer means have a temperature that ranges from about 800° F. to about 1000° F.

8. The method of claim 1 wherein the briquettes have dimensions which range from about 2"×2"×1" to about 6"×2"×2".

* * * * *